US011999873B2

(12) United States Patent
Shimizu et al.

(10) Patent No.: US 11,999,873 B2
(45) Date of Patent: Jun. 4, 2024

(54) DISPERSION COMPRISING COLLOIDAL SILICA PARTICLES AND ZINC CYANURATE PARTICLES

(71) Applicant: NISSAN CHEMICAL CORPORATION, Tokyo (JP)

(72) Inventors: Daisuke Shimizu, Sodegaura (JP); Satoru Murakami, Sodegaura (JP); Yoshiyuki Kashima, Sodegaura (JP); Isao Oota, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 860 days.

(21) Appl. No.: 17/040,912

(22) PCT Filed: Mar. 19, 2019

(86) PCT No.: PCT/JP2019/011550
§ 371 (c)(1),
(2) Date: Sep. 23, 2020

(87) PCT Pub. No.: WO2019/181966
PCT Pub. Date: Sep. 26, 2019

(65) Prior Publication Data
US 2021/0009820 A1    Jan. 14, 2021

(30) Foreign Application Priority Data

Mar. 23, 2018    (JP) .................................. 2018-056709

(51) Int. Cl.
*C09D 7/62* (2018.01)
*B23C 3/00* (2006.01)
(Continued)

(52) U.S. Cl.
CPC .................. *C09D 7/62* (2018.01); *B23C 3/00* (2013.01); *C08K 3/36* (2013.01); *C08K 5/34924* (2013.01);
(Continued)

(58) Field of Classification Search
CPC ......... B23C 3/00; C01B 33/14; C01B 33/145; C08K 3/28; C08K 3/36; C08K 5/34924;
(Continued)

(56) References Cited

U.S. PATENT DOCUMENTS

| 4,329,381 A | 5/1982 | Eschwey et al. |
| 4,507,270 A | 3/1985 | Harth et al. |

(Continued)

FOREIGN PATENT DOCUMENTS

| CN | 103525243 A | 1/2014 |
| CN | 103695916 A | 4/2014 |

(Continued)

OTHER PUBLICATIONS

Jun. 25, 2019 International Search Report issued in International Patent Application No. PCT/JP2019/011550.

(Continued)

*Primary Examiner* — Shuangyi Abu Ali
(74) *Attorney, Agent, or Firm* — Oliff PLC

(57) ABSTRACT

A dispersion wherein dispersoid particles including colloidal silica and zinc cyanurate are dispersed in a liquid medium. The colloidal silica particles may have an average diameter of 5 to 500 nm, and the dispersion may contain 0.1 to 40% by mass of the particles in terms of $SiO_2$ concentration. Primary particles of the zinc cyanurate may have a major axis length of 50 to 1000 nm, a minor axis length of 10 to 300 nm, and a ratio of major to minor axis length of 2 to 25, and the dispersion may contain 0.1 to 50% by mass of the particles in terms of solids content. A mass ratio of the (Continued)

colloidal silica to the zinc cyanurate particles may be 1:0.01 to 100, and total solids content may be 0.1 to 50% by mass. The liquid medium may be water or an organic solvent.

11 Claims, 1 Drawing Sheet

(51) Int. Cl.
    *C08K 3/36*     (2006.01)
    *C08K 5/3492*     (2006.01)
    *C09D 5/02*     (2006.01)
    *C09D 5/08*     (2006.01)
    *C09D 123/08*     (2006.01)
    *C09D 125/14*     (2006.01)
    *C09D 163/00*     (2006.01)

(52) U.S. Cl.
    CPC .................. *C09D 5/02* (2013.01); *C09D 5/08* (2013.01); *C09D 123/0853* (2013.01); *C09D 125/14* (2013.01); *C09D 163/00* (2013.01)

(58) Field of Classification Search
    CPC ............ C09D 123/0853; C09D 125/14; C09D 163/00; C09D 5/02; C09D 5/022; C09D 5/08; C09D 5/084; C09D 7/61; C09D 7/62; C09D 201/00; C09D 7/20; C23F 11/149
    See application file for complete search history.

(56) References Cited

U.S. PATENT DOCUMENTS

| | | | |
|---|---|---|---|
| 2013/0108871 A1* | 5/2013 | Oota | ...................... B82Y 30/00 977/788 |
| 2017/0130062 A1 | 5/2017 | Oota et al. | |

FOREIGN PATENT DOCUMENTS

| | | | |
|---|---|---|---|
| CN | 104004450 A | | 8/2014 |
| CN | 103695916 B | * | 6/2016 |
| CN | 106085124 A | | 11/2016 |
| CN | 106189584 A | | 12/2016 |
| CN | 106700811 A | | 5/2017 |
| EP | 3 392 036 A1 | | 10/2018 |
| JP | S54-123145 A | | 9/1979 |
| JP | S59-031779 A | | 2/1984 |
| JP | H06-41471 A | | 2/1994 |
| JP | 2014055319 A | * | 3/2014 |
| JP | 2014-91798 A | | 5/2014 |
| JP | 2015-117245 A | | 6/2015 |
| WO | 2011/162353 A1 | | 12/2011 |
| WO | 2016/006585 A1 | | 1/2016 |

OTHER PUBLICATIONS

Jun. 25, 2019 Written Opinion of the International Searching Authority issued in International Patent Application No. PCT/JP2019/011550.
Nov. 19, 2021 Extended Search Report issued in European Patent Application No. 19772229.1.
Jun. 29, 2022 Office Action issued in Japanese Patent Application No. 2020-507848.
Jul. 25, 2022 Office Action issued in Taiwanese Patent Application No. 108109945.
Apr. 5, 2023 Office Action Issued in Chinese Patent Application No. 201980020099.2.
Ren Youzhi at al., Technical Standard Manual for Raw Materials for the Coating Industry, 1992.
Nov. 1, 2023 Office Action issued in Japanese Patent Application No. 2022-170169.

* cited by examiner

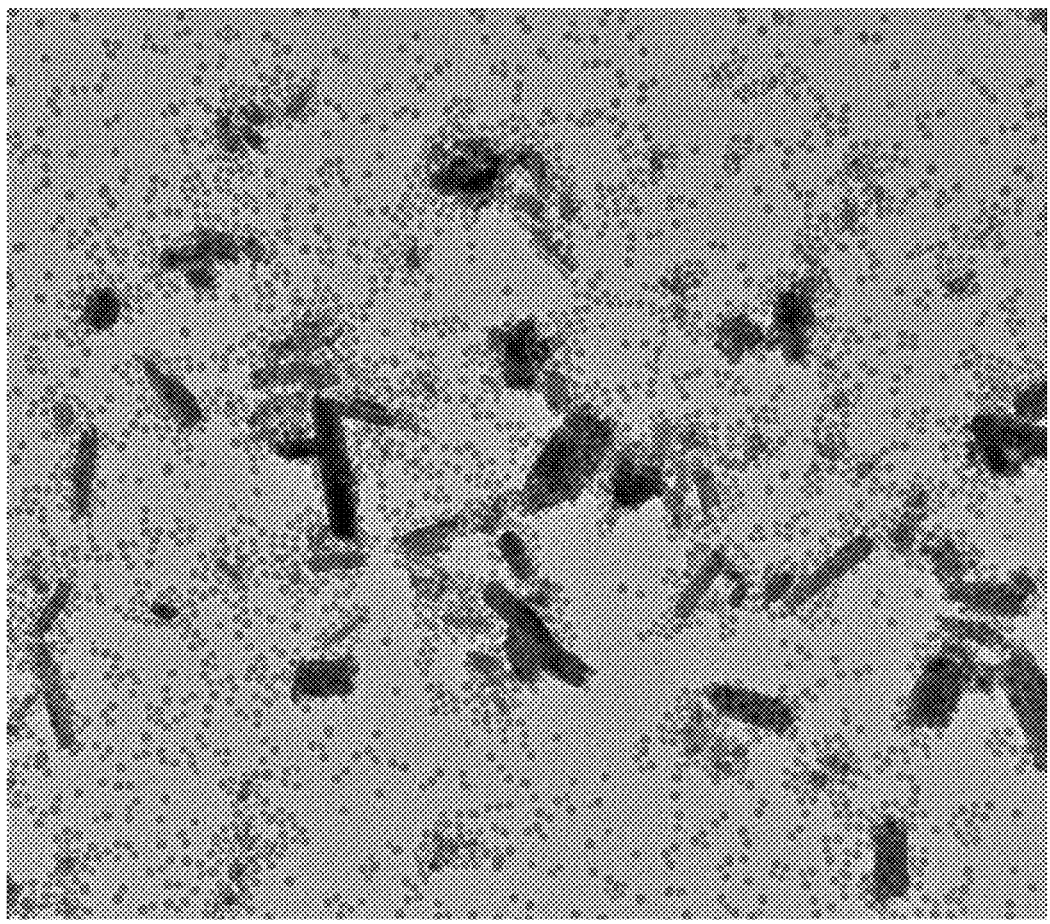

DISPERSION COMPRISING COLLOIDAL SILICA PARTICLES AND ZINC CYANURATE PARTICLES

TECHNICAL FIELD

The present invention relates to a dispersion comprising colloidal silica particles and zinc cyanurate particles, a method for producing the same, and a coating composition comprising the same.

BACKGROUND ART

Zinc cyanurate is known as a corrosion inhibitor for an iron-based metal surface.

For example, there is disclosed a method for producing lead cyanurate or zinc cyanurate, in which PbO or ZnO is mixed with cyanuric acid at 100 to 180° C. to form a paste, and shearing action is applied to the paste at 50 to 250° C. (see Patent Document 1).

As a corrosion-inhibiting coating agent for a metal surface that is based on a zinc salt and/or a lead salt of an organic compound, there is disclosed a composition that contains a zinc salt and/or a lead salt of an organic compound such as barbituric acid or cyanuric acid (see Patent Document 2).

There are disclosed acicular or plate-shaped basic zinc cyanurate fine particles characterized in that the average particle diameter $D_{50}$ as measured by the laser diffraction method is 80 to 900 nm, the specific surface area is 20 to 100 $m^2/g$, the primary particle diameter as observed with a transmission electron microscope is such that the major axis length is 100 to 800 nm, and the minor axis length is 10 to 60 nm, and the ratio of the major axis length/the minor axis length (axial ratio) is 5 to 25 (see Patent Document 3).

There are disclosed acicular or plate-shaped basic zinc cyanurate fine particles which are produced by subjecting a mixed slurry to wet dispersion with a dispersion medium at a temperature in the range from 5 to 55° C., the mixed slurry being formed by blending water, cyanuric acid, and at least one selected from zinc oxides and basic zinc carbonates such that the cyanuric acid concentration is 0.1 to 10.0% by mass based on water, the basic zinc cyanurate fine particles being characterized in that the average particle diameter $D_{50}$ as measured by the laser diffraction method is 80 to 900 nm, and the specific surface area is 20 to 100 $m^2/g$ (see Patent Document 4).

There is disclosed a method for producing a basic zinc cyanurate powder whose amount remaining on a sieve with a mesh size of 1000 µm is less than 1% by mass, the basic zinc cyanurate powder having a primary-particle major axis of 50 to 2000 nm and a primary-particle minor axis of 20 to 300 nm as observed with a transmission electron microscope, the method being characterized by comprising heat-treating, at 30 to 300° C., a powder mixture composed of zinc oxide, cyanuric acid, and water, which has a molar ratio of zinc oxide to cyanuric acid of 2 to 3 and a water content of 9 to 18% by mass, in a closed or unclosed state (see Patent Document 5).

PRIOR ART DOCUMENTS

Patent Documents

Patent Document 1: Japanese Unexamined Patent Application Publication No. S59-031779 (JP 59-031779 A)
Patent Document 2: Japanese Unexamined Patent Application Publication No. S54-123145 (JP 54-123145 A)
Patent Document 3: Japanese Unexamined Patent Application Publication No. 2015-117245 (JP 2015-117245 A)
Patent Document 4: WO 2011/162353
Patent Document 5: WO 2016/006585

SUMMARY OF THE INVENTION

Problem to be Solved by the Invention

Zinc cyanurate is known to have a high corrosion-inhibiting function for a metal surface; however, particles prepared therefrom are acicular or plate-shaped particles, which have a large particle diameter, and when dispersed in a medium, the particles form a slurry, which is difficult to handle when mixed with a resin to produce a coating composition.

The present invention has been made in view of the foregoing circumstances, and an object of the present invention is to provide a dispersion comprising colloidal silica particles and zinc cyanurate particles that can sufficiently exhibit a function of zinc cyanurate such as the inhibition of corrosion of a metal surface, and a coating composition comprising the dispersion.

Means for Solving the Problem

As a result of extensive research to solve the aforementioned problem, the present inventors have found that when colloidal silica particles and zinc cyanurate particles are dispersed as dispersoids in a liquid medium, a stable dispersion having good dispersibility is obtained, thus completing the present invention.

In summary, a first aspect of the present invention relates to a dispersion in which dispersoid particles comprising colloidal silica particles and zinc cyanurate particles are dispersed in a liquid medium.

A second aspect of the present invention relates to the dispersion according to the first aspect, wherein the colloidal silica particles have an average particle diameter of 5 to 500 nm, and the dispersion contains 0.1 to 40% by mass of the colloidal silica particles in terms of $SiO_2$ concentration.

A third aspect of the present invention relates to the dispersion according to the first aspect, wherein primary particles of the zinc cyanurate particles have a major axis length of 50 to 1000 nm and a minor axis length of 10 to 300 nm as observed with a transmission electron microscope, and have a ratio of the major axis length to the minor axis length of 2 to 25, and the dispersion contains 0.1 to 50% by mass of the zinc cyanurate particles in terms of solids content.

A fourth aspect of the present invention relates to the dispersion according to any one of the first to third aspects, wherein the dispersoid particles comprising the colloidal silica particles and the zinc cyanurate particles have an average particle diameter of 80 to 2000 nm based on a laser diffraction method, and the dispersion contains 0.1 to 50% by mass of the colloidal silica particles and the zinc cyanurate particles in terms of total solids content of both particles.

A fifth aspect of the present invention relates to the dispersion according to any one of the first to fourth aspects, wherein a ratio of the colloidal silica particles to the zinc cyanurate particles in the dispersoid particles is 1:0.01 to 100 in terms of colloidal silica:zinc cyanurate mass ratio, and a total solids content of the colloidal silica particles and the zinc cyanurate particles is 0.1 to 50% by mass.

A sixth aspect of the present invention relates to the dispersion according to any one of the first to fifth aspects, wherein the liquid medium is water or an organic solvent.

A seventh aspect of the present invention relates to a coating composition comprising the dispersion according to any one of the first to sixth aspects and a resin emulsion.

An eighth aspect of the present invention relates to the coating composition according to the seventh aspect, wherein the resin emulsion is an oil-in-water emulsion of one or more resins selected from the group consisting of acrylic-based resins, styrene-acrylic-based resins, acrylic-silicone-based resins, vinyl acetate-based resins, styrene-based resins, ethylene-based resins, ethylene-vinyl acetate-based resins, propyl-based resins, ester-based resins, epoxy-based resins, olefin-based resins, phenol-based resins, amide-based resins, vinyl alcohol-based resins, fluorine-based resins, urethane-based resins, melamine-based resins, phthalate-based resins, silicone-based resins, and vinyl chloride-based resins.

A ninth aspect of the present invention relates to the coating composition according to the seventh or eighth aspect, wherein a ratio of a solids content in the dispersion to a resin content in the resin emulsion is 1:0.1 to 10 in terms of (solids content in the dispersion):(resin content in the resin emulsion) mass ratio, and a total solids content in the coating composition is 1 to 70% by mass.

A tenth aspect of the present invention relates to a coating film obtained by applying the coating composition according to any one of the seventh to ninth aspect at a film thickness of 0.1 to 100 μm by means of spin coating, bar coating, roll coating, or dip coating.

An eleventh aspect of the present invention relates to a method for producing the dispersion according to any one of the first to sixth aspects, comprising a step of mixing a silica sol and the zinc cyanurate particles or a slurry thereof, using a liquid dispersion machine.

A twelfth aspect of the present invention relates to the method according to the eleventh aspect, wherein the liquid dispersion machine is a sand grinder, a bead mill, an attritor, or a pearl mill.

A thirteenth aspect of the present invention relates to a method for producing the coating composition according to any one of the seventh to ninth aspects, comprising a step of mixing the dispersion according to any one of the first to sixth aspects and the resin emulsion, using a liquid dispersion machine.

A fourteenth aspect of the present invention relates to the method for producing the coating composition according to any one of the seventh to ninth aspects, comprising a step of mixing a silica sol, the zinc cyanurate particles or a slurry thereof, and the resin emulsion, using a liquid dispersion machine.

A fifteenth aspect of the present invention relates to the method for producing the coating composition according to the thirteenth or fourteenth aspect, wherein the liquid dispersion machine is an agitator, a rotation shear-type agitator, a colloid mill, a roll mill, a high-pressure-jet-type dispersion machine, an ultrasonic dispersion machine, a container driven-type mill, a medium agitation mill, or a kneader.

Effects of the Invention

The colloidal silica particles are stably dispersed in a liquid, such that the colloidal silica particles and the zinc cyanurate particles synergistically produce a dispersion-stabilizing effect. The colloidal silica particles contribute to the dispersion-stabilizing effect, and the zinc cyanurate particles are also stably dispersed.

The colloidal silica particles and the zinc cyanurate particles have a high dispersion-stabilizing effect as dispersoid particles, such that the dispersion in which these particles are dispersed in a liquid medium has good stability even when it is mixed with a resin emulsion, and has high handleability in the production of a coating composition or the like. The zinc cyanurate particles are also stably dispersed in the coating composition, and the zinc cyanurate particles are homogeneously present in a coating film of the coating composition. Thus, a function originally possessed by zinc cyanurate such as corrosion inhibition is expected to be sufficiently exhibited.

BRIEF DESCRIPTION OF THE DRAWING

FIG. 1 is a transmission electron microscope (TEM) photograph (×40000 magnification) of a dispersion of colloidal silica particles and zinc cyanurate particles obtained in Example 1.

MODES FOR CARRYING OUT THE INVENTION

The present invention provides a dispersion in which dispersoid particles comprising colloidal silica particles and zinc cyanurate particles are dispersed in a liquid medium.

The average particle diameter of the colloidal silica can be measured by a nitrogen gas adsorption method (BET method). The primary particle diameter ($D_B$ nm) represents the primary particle diameter calculated from the specific surface area S m$^2$/g measured by the BET method, using the equation ($D_B$ nm)=2720/S. The primary particle diameter ($D_B$ nm) refers to the particle diameter calculated as spherical silica particles. The average particle diameter of this value is in the range of 5 to 500 nm, 5 to 200 nm, 5 to 100 nm, or 5 to 50 nm. The average particle diameter can be confirmed by observing the particle shapes with an electron microscope (transmission electron microscope), and is in the range of 5 to 500 nm.

As the colloidal silica, a silica sol in which the silica is dispersed in a liquid medium may be used. A silica sol having an $SiO_2$ concentration in the range of 0.1 to 40% by mass, 0.1 to 20% by mass, or 0.1 to 10% by mass may be used as the silica sol. Examples of the medium include an aqueous medium and an organic medium (organic solvent). For example, trade name SNOWTEX manufactured by Nissan Chemical Industries, Ltd. may be used as the silica sol.

Zinc cyanurate may be used at a molar ratio calculated as (zinc oxide)/(cyanuric acid) of 1.0 to 5.0. Examples of zinc sources include zinc oxide and basic zinc carbonate. The zinc source may be used at the above-mentioned molar ratio calculated as zinc oxide. For example, zinc oxide No. 2 (JIS) manufactured by Sakai Chemical Industry Co., Ltd. may be used as the zinc oxide.

When cyanuric acid, which is a tribasic acid, is reacted with divalent zinc, it may produce an acid salt, a neutral salt, or a basic salt. For example, when a molar ratio calculated as (zinc oxide)/(cyanuric acid) is 1.0, an acid salt equivalent to $Zn(C_3N_3O_3H)$ is formed. When a molar ratio calculated as (zinc oxide)/(cyanuric acid) is 1.5, a neutral salt equivalent to $Zn_3(C_3N_3O_3)_2$ is formed. When a molar ratio calculated as (zinc oxide)/(cyanuric acid) is 2.5, a basic salt equivalent to $Zn_3(C_3N_3O_3)_2 \cdot 2ZnO$ is formed. These salts may contain crystalline water, and may form a monohydrate, a dihydrate, and a trihydrate, for example.

In the present invention, a basic salt is preferably used. For example, $Zn_3(C_3N_3O_3)_2 \cdot 2Zn \cdot 3H_2O$ may be used.

The zinc cyanurate particles are not spherical, and are acicular or plate-shaped elongated particles. Primary particles of the zinc cyanurate particles have a major axis length of 50 to 1000 nm and a minor axis length of 10 to 300 nm as observed with a transmission electron microscope, and have a major axis length/minor axis length ratio of 2 to 25. The zinc cyanurate particles have a specific surface area of 10 to 100 $m^2/g$.

The average particle diameter of the zinc cyanurate particles based on a laser diffraction method may be measured as follows: The zinc cyanurate particles or a dispersion containing the zinc cyanurate particles is dispersed in pure water, and the average particle diameter in the liquid is measured using a laser diffraction particle size distribution analyzer, for example, trade name SALD-7500nano manufactured by Shimadzu Corporation. The average particle diameter of the zinc cyanurate particles dispersed in water based on the laser diffraction method is 80 to 20000 nm.

There are two methods for producing the zinc cyanurate particles, i.e., one in which a liquid-phase reaction is carried out using raw materials dispersed in water in slurry form, and the other in which a solid-phase reaction is carried out using raw materials in powder form.

The method in which a liquid-phase reaction is carried out using raw materials dispersed in water in slurry form, is performed, for example, as follows: Zinc oxide or basic zinc carbonate, cyanuric acid, and water are blended such that the cyanuric acid concentration is 0.1 to 10.0% by mass, and the slurry mixture is subjected to wet dispersion using a liquid dispersion machine at a temperature of 5 to 55° C. to carry out the reaction and dispersion of the product. As a result, a slurry of zinc cyanurate particles is obtained. Cyanuric acid dissolves in water, and the dissolved cyanuric acid rapidly reacts with zinc oxide or basic zinc carbonate, which promotes particle growth and thus, the particles easily become large. Therefore, the reaction is preferably carried out at 55° C. or lower, or 45° C. or lower.

The obtained slurry is subjected to wet dispersion using a liquid dispersion machine (dispersion medium) at 5 to 55° C. to carry out the reaction and dispersion. As a result, a dispersion of zinc cyanurate is obtained.

The wet dispersion is performed using a dispersion medium. When the wet dispersion using a dispersion medium is performed, cyanuric acid and at least one selected from zinc oxide and basic zinc carbonate can be mechanochemically reacted by means of mechanical energy generated by collision of the dispersion medium. The mechanochemical reaction refers to a chemical reaction of cyanuric acid and zinc oxide or basic zinc carbonate caused by applying mechanical energy from many directions by means of collision of the dispersion medium.

Examples of the dispersion medium include stabilized zirconia beads, quartz glass beads, soda lime glass beads, alumina beads, and mixtures thereof. In consideration of contamination due to crushing of the dispersion medium upon collision of the dispersion medium with itself, stabilized zirconia beads are preferably used as the dispersion medium. The dispersion medium has a diameter of 0.1 to 10 mm, for example, and preferably has a diameter of 0.5 to 2.0 mm. If the diameter of the dispersion medium is less than 0.1 mm, the collision energy of the dispersion medium upon collision with itself will be low, and the mechanochemical reactivity tends to be weak. If the diameter of the dispersion medium is over 10 mm, the collision energy of the dispersion medium upon collision with itself will be excessively high, and the dispersion medium will be crushed to cause much contamination, which is undesirable.

The apparatus (liquid dispersion machine) for performing the wet dispersion using the dispersion medium is not limited as long as it allows the mechanochemical reaction of cyanuric acid and zinc oxide or basic zinc carbonate to be carried out by adding the slurry mixture in a container containing the dispersion medium, followed by stirring to cause collision of the dispersion medium with cyanuric acid and zinc oxide or basic zinc carbonate. Examples of the apparatus include a sand grinder (manufactured by Aimex Corporation), an apex mill (manufactured by Hiroshima Metal & Machinery Co., Ltd. (Kotobuki Industries Co., Ltd.)), an attritor (manufactured by Nippon Coke & Engineering. Co., Ltd.), and a pearl mill (manufactured by Ashizawa Finetech Ltd.). The rotation speed, the reaction time, and the like of the apparatus for stirring the dispersion medium may be adjusted appropriately according to the desired particle diameter and the like.

The zinc cyanurate particles are contained in the dispersion in an amount in the range of 0.10 to 50% by mass, 0.1 to 20% by mass, 0.1 to 10% by mass, or 0.1 to 5% by mass, in terms of solids content.

Primary particles of the zinc cyanurate particles obtained by this method have a major axis length of 100 to 800 nm and a minor axis length of 10 to 60 nm as observed with a transmission electron microscope, and have a major axis length/minor axis length ratio of 5 to 25. Moreover, the zinc cyanurate particles have an average particle diameter of 80 to 900 nm based on the laser diffraction method. A zinc cyanurate powder obtained by drying a slurry of the zinc cyanurate dispersed in water at 110° C. has a specific surface area of 10 to 100 $m^2/g$.

The method in which a solid-phase reaction is carried out using raw materials in powder form, can be performed, for example, as follows: A powder mixture whose amount remaining on a sieve with a mesh size of 1000 μm is less than 1% by mass, the power mixture being composed of zinc oxide, cyanuric acid, and water, and having a molar ratio of zinc oxide to cyanuric acid of 2 to 3 and a water content of 9 to 18% by mass, is heat-treated at 30 to 300° C. in a closed or unclosed state. The resulting zinc cyanurate powder contains about 10% by mass of water, and thus, is heat-treated in an unclosed state to remove the water, thereby giving zinc cyanurate having a water content of less than 1.0% by mass. As such zinc cyanurate, trade name STAR-FINE manufactured by Nissan Chemical Industries, Ltd., for example, may be used. For industrial mass production, the heat treatment is preferably performed using a powder mixer having a mixing means and a heating means. Specific examples of the powder mixer include heat-type reaction vessels capable of stirring and mixing in a closed or unclosed state, such as a vibrating dryer, a Henschel mixer, a Loedige mixer, a Nauta mixer, and a rotary kiln. The zinc cyanurate obtained by this method has an amount remaining on a sieve with a mesh size of 400 μm of less than 10% by mass. Primary particles of the zinc cyanurate have a major axis length of 50 to 1000 nm and a minor axis length of 10 to 300 nm as observed with a transmission electron microscope, and have a major axis length/minor axis length ratio of 2 to 10. The zinc cyanurate has an average particle diameter of 0.5 to 20 μm based on the laser diffraction method. Moreover, the obtained zinc cyanurate powder has a specific surface area of 10 to 100 $m^2/g$. The zinc cyanurate powder has a negatively charged surface in an aqueous medium at a pH in the range of 3 to 10. Thus, the zinc cyanurate powder exhibits not only good dispersibility in water at a pH in an acidic to alkaline range, but also good compatibility with a synthetic resin or an emulsion thereof in the preparation of a waterborne rust-inhibiting coating material, thus being capable of producing a stable waterborne rust-inhibiting coating material.

Examples of methods for mixing the colloidal silica and the zinc cyanurate as used herein include mixing the silica sol and a slurry of the zinc cyanurate; and mixing the silica sol with the zinc cyanurate powder.

The mixture of the colloidal silica and the zinc cyanurate may be dispersed by means of, for example, the same apparatus as that used for the wet dispersion of the zinc cyanurate, including a sand grinder (manufactured by Aimex Corporation), an apex mill (manufactured by Hiroshima Metal & Machinery Co., Ltd. (Kotobuki Industries Co., Ltd.)), an attritor (manufactured by Nippon Coke & Engineering. Co., Ltd.), and a pearl mill (manufactured by Ashizawa Finetech Ltd.). The rotation speed, the reaction time, and the like of the apparatus for stirring the dispersion medium may be adjusted appropriately according to the desired particle diameter and the like. The resulting dispersion in which the dispersoid particles comprising the colloidal silica particles and the zinc cyanurate particles are dispersed in a liquid medium has an average particle diameter of 80 to 2000 nm, 80 to 1000 nm, or 10 to 500 nm based on the laser diffraction method, and the dispersion contains 0.1 to 50% by mass of the colloidal silica particles and the zinc cyanurate particles in terms of total solids content of both particles.

Preferably, the ratio of the colloidal silica particles to the zinc cyanurate particles is 1:0.01 to 100 or 1:0.1 to 10 in terms of colloidal silica:zinc cyanurate mass ratio, and the total solids content of the colloidal silica particles and the zinc cyanurate particles is 0.1 to 50% by mass, 0.1 to 30% by mass, or 0.1 to 20% by mass.

In the resulting dispersion in which the dispersoid particles comprising the colloidal silica particles and the zinc cyanurate particles are dispersed in a liquid medium, the liquid medium is an aqueous medium or an organic solvent. The aqueous medium may be replaced with an organic solvent by adopting an evaporation method with a rotary evaporator or the like.

Examples of the organic solvent that can be used include alcohols, glycols, esters, ketones, nitrogen-containing solvents, and aromatic solvents. Examples of these solvents include organic solvents such as methanol, ethanol, propanol, ethylene glycol, propylene glycol, glycerin, ethylene glycol monomethyl ether, propylene glycol monomethyl ether, propylene glycol monomethyl ether acetate, propylene glycol monoethyl ether, propylene glycol monoethyl ether acetate, acetone, methyl ethyl ketone, dimethylformamide, N-methyl-2-pyrrolidone, toluene, xylene, and dimethylethane. Polyethylene glycol, silicone oils, reactive diluents containing a radically polymerizable vinyl group or an epoxy group, and the like can also be used.

Furthermore, the surface of the silica particles may be treated with a silane coupling agent, for example, tetraethoxysilane, methyltrimethoxysilane, methyltriethoxysilane, dimethyldimethoxysilane, dimethyldiethoxysilane, phenyltrimethoxysilane, phenyltriethoxysilane, dimethoxydiphenylsilane, n-propyltrimethoxysilane, n-propyltriethoxysilane, hexyltrimethoxysilane, hexyltriethoxysilane, decyltrimethoxysilane, octyltriethoxysilane, trimethylmonoethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-mercaptopropylmethyldimethoxysilane, 3-mercaptopropyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, N-phenyl-3-aminopropyltrimethoxysilane, 3-acryloxypropyltrimethoxysilane, vinyltrimethoxysilane, vinyltriethoxysilane, 3-isocyanatepropyltriethoxysilane, and hexamethyldisilazane.

A coating composition can be produced by mixing the dispersion with a resin emulsion.

The resin emulsion is, for example, an oil-in-water emulsion of one or more resins selected from the group consisting of acrylic-based resins, styrene-acrylic-based resins, acrylic-silicone-based resins, vinyl acetate-based resins, styrene-based resins, ethylene-based resins, ethylene-vinyl acetate-based resins, propyl-based resins, ester-based resins, epoxy-based resins, olefin-based resins, phenol-based resins, amide-based resins, vinyl alcohol-based resins, fluorine-based resins, urethane-based resins, melamine-based resins, phthalate-based resins, silicone-based resins, and vinyl chloride-based resins. These resin emulsions are aqueous resin emulsions, which may have, for example, a pH in the range of 7 to 10 or 3 to 6.5, a resin solids content in the range of 30 to 65% by mass, and a viscosity in the range of about 20 to 20000 mPa·s.

Examples of acrylic-based emulsions include trade names Mowinyl DM772, Mowinyl 6520 and Mowinyl 6530 manufactured by Japan Coating Resin Co., Ltd., each of which is an anionic resin emulsion and also include trade name Voncoat 40-418EF manufactured by DIC Corporation;

examples of styrene-acrylic-based emulsions include trade names Mowinyl DM60, Mowinyl 749E and LDM6740 manufactured by Japan Coating Resin Co., Ltd., each of which is an anionic resin emulsion;

examples of acrylic-silicone-based emulsions include trade name Mowinyl LMD7523 manufactured by Japan Coating Resin Co., Ltd., which is an anionic resin emulsion, and also include trade name Voncoat SA-6360 manufactured by DIC Corporation;

examples of vinyl acetate-based emulsions include trade name Mowinyl 206 manufactured by Japan Coating Resin Co., Ltd., which is a nonionic resin emulsion;

examples of ethylene-vinyl acetate-based emulsions include trade name Mowinyl 109E manufactured by Japan Coating Resin Co., Ltd., which is a nonionic resin emulsion; and examples of epoxy-based emulsions include trade name EPICLON H-502-42W manufactured by DIC Corporation.

A styrene-acrylic-based emulsion and an acrylic-silicone-based emulsion are preferred as the resin emulsion.

The coating composition may be prepared such that the ratio of the solids content in the dispersion to the resin content in the resin emulsion is 1:0.1 to 10 in terms of (solids content in the dispersion):(resin content in the resin emulsion) mass ratio, and the total solids content in the coating composition is 1 to 70% by mass, 1 to 50% by mass, or 1 to 30% by mass.

The coating composition can be obtained by dispersing the dispersion of the colloidal silica particles and the zinc cyanurate particles, and the resin emulsion, using a liquid dispersion machine. Alternatively, a mixture of the silica sol, the zinc cyanurate particles or a slurry thereof, and the resin emulsion may be dispersed using a liquid dispersion machine.

Examples of the liquid dispersion machine include an agitator, a rotation shear-type agitator, a colloid mill, a roll mill, a high-pressure-jet-type dispersion machine, an ultrasonic dispersion machine, a container driven-type mill, a medium agitation mill, and a kneader.

The agitator is the simplest form of disperser, in which objects can be dispersed by means of velocity variation near the impeller or collision against the impeller.

The rotation shear-type agitator is a disperser in which objects are dispersed by passing them through a narrow gap between the high-speed rotating blade and the external cylinder; the objects can be dispersed by means of velocity variation and shear flow in the gap.

The colloid mill can disperse objects by means of shear flow through a narrow gap between the high-speed rotating disk and the stationary disk.

The roll mill can disperse objects by means of shear force and compressive force by utilizing the gap between two or three rotating rolls.

The high-pressure-jet-type dispersion machine can disperse objects by directing high-pressure jets of a treatment liquid to cause collision against the stationary plate or collision of the treatment liquid with itself.

The ultrasonic dispersion machine can disperse objects by means of ultrasonic vibration.

The container driven-type mill disperses objects by means of collision and friction of a medium (balls) inserted into the stationary container; examples include a rotary mill, a vibrating mill, and a planetary mill.

The medium agitation mill disperses objects by means of collision force and shear force of balls or beads used as a medium; examples include an attritor and a bead mill.

The coating composition obtained by mixing the aqueous dispersion and the resin emulsion can be produced at a pH in the range of 7 to 10. Then, 100 to 10000 ppm of aqueous ammonia may be added as an alkali component to adjust the pH in the range of 10 to 11.

The coating composition can form a coating film by coating an iron-based metal. While the film thickness of the coating film may vary depending on the viscosity, it may be selected in the range of 0.1 to 100 μm, for example.

Examples of coating methods include spin coating, bar coating, roll coating, and dip coating.

EXAMPLES (1) The following silica sols were prepared.

Aqueous silica sol A (trade name SNOWTEX-N40 manufactured by Nissan Chemical Industries, Ltd.; average particle diameter based on the BET method: 21.4 nm; pH 9.4; solids content: 40.4% by mass)

Aqueous silica sol B (trade name SNOWTEX-OL40 manufactured by Nissan Chemical Industries, Ltd.; average particle diameter based on the BET method: 45.6 nm; pH 2.3; solids content: 40.5% by mass)

(2) The following zinc cyanurate was prepared.

trade name STARFINE manufactured by Nissan Chemical Industries, Ltd.

(average particle diameter based on the laser diffraction method: 1.7 μm; primary-particle major axis length as observed with a transmission electron microscope: 400 to 600 nm, minor axis length: 50 to 70 nm, major axis length/minor axis length ratio: 2 to 10; specific surface area: 15 $m^2/g$; molar ratio calculated as (zinc oxide)/(cyanuric acid):2.5)

(3) The following resin emulsions were prepared.

Resin emulsion A (acrylic-silicone-based emulsion manufactured by Japan Coating Resin Co., Ltd.; trade name Mowinyl LMD7523; resin concentration: 47.0% by mass; anionic resin emulsion)

Resin emulsion B (styrene-acrylic-based emulsion manufactured by Japan Coating Resin Co., Ltd.; trade name Mowinyl 749E; resin concentration: 47.0% by mass; anionic resin emulsion)

Resin emulsion C (acrylic-based emulsion manufactured by DIC Corporation; trade name Voncoat 40-418EF; resin concentration: 55.0% by mass; anionic resin emulsion)

Resin emulsion D (epoxy-based emulsion manufactured by DIC Corporation; trade name EPICLON H-502-42W; resin concentration: 39.0% by mass)

(4) The average particle diameter of the dispersoid particles was measured by the laser diffraction method.

The dispersion containing the colloidal silica particles and the zinc cyanurate particles was diluted with pure water, and then the average particle diameter of the dispersoid was measured using, for example, trade name SALD-7500nano manufactured by Shimadzu Corporation.

(5) The colloidal silica particles and the zinc cyanurate particles contained in the dispersion were observed with an electron microscope.

The particles were observed with a transmission electron microscope (JEM-1010 manufactured by JEOL Co., Ltd.) at an acceleration voltage of 100 kV.

Example 1

In a 500-ml polypropylene container, 125 g of the aqueous silica sol A and 325 g of pure water were placed, and 50 g of zinc cyanurate was added with stirring using an agitator equipped with a turbine blade to prepare a slurry mixture ($SiO_2$ concentration: 10.1% by mass, zinc cyanurate concentration: 10.0% by mass). Subsequently, in a 250-ml polypropylene container, 150 g of the slurry mixture and 180 g of glass beads with a diameter of 0.7 to 1.0 mm were placed, after which the container was mounted on a ball mill turntable set at a rotation speed of 165 rpm, and wet grinding was performed for 30 hours to prepare a dispersion having an average particle diameter of 153 nm based on the laser diffraction method.

To a 250-ml polypropylene container, 141.8 g of pure water, 0.2 g of 28% $NH_3$, 5.9 g of the dispersion, and 58.3 g of the resin emulsion A were added, and the mixture was stirred using an agitator equipped with a turbine blade for 2 hours to obtain a coating composition 1 having a solids content of 14% by mass and a pH=8.8.

Example 2

To a 250-ml polypropylene container, 141.8 g of pure water, 0.2 g of 28% $NH_3$, 5.9 g of the dispersion obtained in Example 1, and 58.3 g of the resin emulsion B were added, and the mixture was stirred using an agitator equipped with a turbine blade for 2 hours to obtain a coating composition 2 having a solids content of 14% by mass and a pH=9.3.

Example 3

To a 250-ml polypropylene container, 150.3 g of pure water, 0.2 g of 28% $NH_3$, 5.9 g of the dispersion obtained in Example 1, and 49.8 g of the resin emulsion C were added, and the mixture was stirred using an agitator equipped with a turbine blade for 2 hours to obtain a coating composition 3 having a solids content of 14% by mass and a pH=9.4.

Example 4

In a 500-ml polypropylene container, 125 g of the aqueous silica sol B and 325 g of pure water were placed, and 50 g of zinc cyanurate was added with stirring using an agitator equipped with a turbine blade to prepare a slurry mixture ($SiO_2$ concentration: 10.1% by mass, zinc cyanurate concentration: 10.0% by mass). Subsequently, in a 250-ml polypropylene container, 150 g of the slurry mixture and 180 g of glass beads with a diameter of 0.7 to 1.0 mm were placed, after which the container was mounted on a ball mill turntable set at a rotation speed of 165 rpm, and wet grinding was performed for 30 hours to prepare a dispersion having an average particle diameter of 216 nm based on the laser diffraction method.

To a 250-ml polypropylene container, 141.8 g of pure water, 0.2 g of 28% $NH_3$, 5.9 g of the dispersion, and 58.3 g of the resin emulsion B were added, and the mixture was stirred using an agitator equipped with a turbine blade for 2 hours to obtain a coating composition 4 having a solids content of 14% by mass and a pH=8.9.

Example 5

To a 250-ml polypropylene container, 150.3 g of pure water, 0.2 g of 28% $NH_3$, 5.9 g of the dispersion obtained in Example 4, and 49.8 g of the resin emulsion C were added, and the mixture was stirred using an agitator equipped with a turbine blade for 2 hours to obtain a coating composition 5 having a solids content of 14% by mass and a pH=9.4.

Example 6

To a 250-ml polypropylene container, 128.0 g of pure water, 5.9 g of the dispersion obtained in Example 4, and 70.2 g of the resin emulsion D were added, and the mixture was stirred using an agitator equipped with a turbine blade for 2 hours to obtain a coating composition 6 having a solids content of 14% by mass and a pH=9.7.

Comparative Example 1

To a 250-ml polypropylene container, 126.8 g of pure water, 0.2 g of 28% $NH_3$, 5.1 g of the aqueous silica sol A, and 49.8 g of the resin emulsion A were added, and the mixture was stirred using an agitator equipped with a turbine blade for 2 hours to obtain a comparative coating composition 1 having a solids content of 14% by mass and a pH=9.0.

Comparative Example 2

To a 250-ml polypropylene container, 154.9 g of pure water, 0.2 g of 28% $NH_3$, 5.1 g of the aqueous silica sol A, and 49.8 g of the resin emulsion C were added, and the mixture was stirred using an agitator equipped with a turbine blade for 2 hours to obtain a comparative coating composition 2 having a solids content of 14% by mass and a pH=9.5.

Comparative Example 3

In a 500-ml polypropylene container, 180 g of pure water was placed, and 45 g of zinc cyanurate was added with stirring using an agitator equipped with a turbine blade to prepare a slurry mixture (zinc cyanurate concentration: 20.0% by mass). Subsequently, in a 250-ml polypropylene container, 150 g of the slurry mixture and 180 g of glass beads with a diameter of 0.7 to 1.0 mm were placed, after which the container was mounted on a ball mill turntable set at a rotation speed of 165 rpm, and wet grinding was performed for 30 hours to prepare a dispersion having an average particle diameter of 858 nm based on the laser diffraction method.

To a 250-ml polypropylene container, 146.9 g of pure water, 0.2 g of 28% $NH_3$, 2.9 g of the dispersion, and 49.8 g of the resin emulsion C were added, and the mixture was stirred using an agitator equipped with a turbine blade for 2 hours to obtain a comparative coating composition 3 having a solids content of 14% by mass and a pH=9.5.

(6) Test Sheet to Be Coated and Coated Steel Sheet

A mild steel sheet [SPCC, bright finished] having a sheet thickness of 0.5 mm, and having dimensions of 100 mm in width×150 mm in length was used as a specimen.

A test sheet was prepared as follows: The specimen was impregnated with a 10% NaOH solution for 12 hours to remove any oil or dirt on the surface. After wetting of the entire surface of the test sheet with water was visually confirmed, pure water was further poured over the test sheet, and the test sheet was thoroughly wiped dry with hard-type paper under the trade name JK Wiper-150-S manufactured by Nippon Paper Crecia Co., Ltd.

(Coating Method)

The test sheet surface was coated with each of the coating compositions 1 to 6 and the comparative coating compositions 1 to 3 by bar coating, dried at 110° C. for 5 minutes, and baked in an electric furnace set at 250° C. for 10 minutes to obtain a coated steel sheet. Bar coating was specifically performed as follows:

Bar coating: the coating composition was dropped onto the test sheet, and the test sheet was coated with a #5 bar coater at a wet coating film thickness of 11.4 μm.

(7) Salt Spray Test

Each of the coated steel sheets was examined for its rust-inhibiting effect in accordance with JIS-Z-2371, by means of a salt spray test in which the coated steel sheet was placed in an atmosphere sprayed with a 5% by mass aqueous solution of NaCl at 35° C. for 24 hours, using the salt spray tester STP-90V-5 manufactured by Suga Test Instruments Co., Ltd. The results are shown in Table 1.

⊙: No change
◯: A red-rust area of 10% or less by visual observation
Δ: A red-rust area of 10 to 50% by visual observation
x: A red-rust area of 50 to 90% by visual observation
x x: A red-rust area of 90% or more by visual observation

TABLE 1

|  | Salt Spray Test |
| --- | --- |
| Coating Composition 1 | ⊙ |
| Coating Composition 2 | ⊙ |
| Coating Composition 3 | ◯ |
| Coating Composition 4 | ⊙ |
| Coating Composition 5 | ◯ |
| Coating Composition 6 | ⊙ |
| Comparative Coating Composition 1 | X |
| Comparative Coating Composition 2 | X |
| Comparative Coating Composition 3 | X X |

(8) Thermal Stability Test

Each of the coating compositions 1 to 6 obtained in Examples 1 to 6 and the comparative coating compositions 1 to 3 obtained in Comparative Examples 1 to 3 was stored at 50° C. for 28 days, and a change between the average particle diameter (nm) based on the dynamic light scattering method before the beginning of the test and the average particle diameter (nm) based on the dynamic light scattering method after 28 days was examined. The average particle diameter based on the dynamic light scattering method was measured by diluting the coating composition with pure water, and measuring the average particle diameter in the liquid, using a dynamic light scattering particle diameter analyzer, for example, ZETASIZER Nano series manufactured by Malvern Instruments Ltd. The results are shown in Table 2.

◯: The average particle diameter (nm) based on the dynamic light scattering method was less than +10% of the initial value.

Δ: The average particle diameter (nm) based on the dynamic light scattering method was +10% or more and less than +20% of the initial value.

x: The average particle diameter (nm) based on the dynamic light scattering method was +20% or more of the initial value.

TABLE 2

|  | Thermal Stability Test |
| --- | --- |
| Coating Composition 1 | ◯ |
| Coating Composition 2 | ◯ |
| Coating Composition 3 | ◯ |
| Coating Composition 4 | ◯ |
| Coating Composition 5 | ◯ |
| Coating Composition 6 | ◯ |
| Comparative Coating Composition 1 | ◯ |
| Comparative Coating Composition 2 | X |
| Comparative Coating Composition 3 | Δ |

FIG. 1 shows a transmission electron microscope (TEM) photograph (×40000 magnification) of the dispersion of colloidal silica particles and zinc cyanurate particles obtained in Example 1.

INDUSTRIAL APPLICABILITY

A dispersion comprising colloidal silica particles and zinc cyanurate particles and a coating composition comprising the dispersion can be used for, for example, inhibiting the corrosion of a metal surface.

The invention claimed is:

1. A dispersion in which dispersoid particles comprising colloidal silica particles and zinc cyanurate particles are dispersed in a liquid medium,
wherein the colloidal silica particles have an average particle diameter of 5 to 500 nm, and the dispersion contains 0.1 to 40% by mass of the colloidal silica particles in terms of $SiO_2$ concentration,
wherein primary particles of the zinc cyanurate particles have a major axis length of 50 to 1000 nm and a minor axis length of 10 to 300 nm as observed with a transmission electron microscope, and have a ratio of the major axis length to the minor axis length of 2 to 25, and the dispersion contains 0.1 to 50% by mass of the zinc cyanurate particles in terms of solids content, and
wherein the dispersoid particles comprising the colloidal silica particles and the zinc cyanurate particles have an average particle diameter of 80 to 2000 nm based on a laser diffraction method, and the dispersion contains 0.2 to 50.1% by mass of the colloidal silica particles and the zinc cyanurate particles in terms of total solids content of both particles.

2. The dispersion according to claim 1, wherein a ratio of the colloidal silica particles to the zinc cyanurate particles in the dispersoid particles is 1:0.01 to 100 in terms of colloidal silica:zinc cyanurate mass ratio.

3. The dispersion according to claim 1, wherein the liquid medium is water or an organic solvent.

4. A method for producing the dispersion according to claim 1, comprising a step of mixing a silica sol and the zinc cyanurate particles or a slurry thereof, using a liquid dispersion machine.

5. The method according to claim 4, wherein the liquid dispersion machine is a sand grinder, a bead mill, an attritor, or a pearl mill.

6. The dispersion according to claim 1, wherein the colloidal silica particles have an average particle diameter of 5 to 50 nm.

7. The dispersion according to claim 1, wherein the dispersion contains 0.1 to 10% by mass of the colloidal silica particles in terms of $SiO_2$ concentration.

8. The dispersion according to claim 1, wherein the dispersion contains 0.1 to 5% by mass of the zinc cyanurate particles in terms of solids content.

9. The dispersion according to claim 1, wherein the dispersoid particles comprising the colloidal silica particles and the zinc cyanurate particles have an average particle diameter of 80 to 1000 nm.

10. The dispersion according to claim 1, wherein the dispersion contains 0.2 to 30% by mass of the colloidal silica particles and the zinc cyanurate particles in terms of total solids content of both particles.

11. The dispersion according to claim 1, wherein the dispersion contains 0.2 to 20% by mass of the colloidal silica particles and the zinc cyanurate particles in terms of total solids content of both particles.

* * * * *